(12) United States Patent
Paul et al.

(10) Patent No.: US 10,968,990 B2
(45) Date of Patent: Apr. 6, 2021

(54) DRIVE ARRANGEMENT FOR A MOTOR VEHICLE FUNCTIONAL PART

(71) Applicant: Dr. Ing. h.c. F. Porsche Aktiengesellschaft, Stuttgart (DE)

(72) Inventors: Joachim Paul, Benningen a.N. (DE); Thomas Huebener, Stuttgart (DE); Ulrich Karl Hohl, Heilbronn (DE); Wolfgang Maier, Tamm (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/540,098

(22) Filed: Aug. 14, 2019

(65) Prior Publication Data

US 2020/0056682 A1 Feb. 20, 2020

(30) Foreign Application Priority Data

Aug. 16, 2018 (DE) .......................... 10 2018 119 906

(51) Int. Cl.

| F16H 27/02 | (2006.01) |
| F16H 29/02 | (2006.01) |
| F16H 29/20 | (2006.01) |
| F16H 19/08 | (2006.01) |
| B62D 35/00 | (2006.01) |
| F16H 57/12 | (2006.01) |
| F16H 1/20 | (2006.01) |

(52) U.S. Cl.
CPC ........... *F16H 19/08* (2013.01); *B62D 35/007* (2013.01); *F16H 1/203* (2013.01); *F16H 57/12* (2013.01); *F16H 2057/127* (2013.01)

(58) Field of Classification Search
CPC ............. F16H 19/08; F16H 2025/2463; B62D 35/007
See application file for complete search history.

(56) References Cited

U.S. PATENT DOCUMENTS

| 2,922,220 A * | 1/1960 | Sacchini ................. B21F 35/00 29/896.91 |
| 3,796,292 A * | 3/1974 | Harrison ................ B63H 25/10 192/223.4 |
| 4,246,991 A * | 1/1981 | Oldakowski ............ F16D 49/02 192/223.4 |
| 4,652,781 A | 3/1987 | Andrei-Alexandru et al. |

FOREIGN PATENT DOCUMENTS

| DE | 35677 A1 | 1/1965 |
| DE | 3434905 C2 | 4/1986 |
| DE | 102009029877 A1 | 12/2010 |
| DE | 102012221023 A1 | 5/2014 |

* cited by examiner

*Primary Examiner* — Jake Cook
(74) *Attorney, Agent, or Firm* — Leydig, Voit & Mayer, Ltd.

(57) ABSTRACT

A drive arrangement for a motor vehicle functional part includes: a housing, in which a drive motor, a gear mechanism and an adjustor are provided at least partially; a drive shaft configured to transfer the adjustor via the gear mechanism from a closed position into an open position and vice versa; and a wrap spring arrangement comprising two wrap spring members, which act in opposite directions. The wrap spring arrangement is arranged on a gear mechanism output side, in a region of the adjustor.

10 Claims, 2 Drawing Sheets

DRIVE ARRANGEMENT FOR A MOTOR VEHICLE FUNCTIONAL PART

CROSS-REFERENCE TO RELATED APPLICATION

Priority is claimed to German Patent Application No. DE 10 2018 119 906.6, filed on Aug. 16, 2018, the entire disclosure of which is hereby incorporated by reference herein.

FIELD

The present invention relates to a drive arrangement for a motor vehicle functional part having a housing arrangement.

BACKGROUND

Drive arrangements are used in the automotive field in a versatile way. Here, the terms closed position and open position are used by way of example. They also comprise positions, such as a retracted position and an extended position and also a folded-in position and a folded-out position. One example of a drive arrangement of this type can be found in German patent specification 34 34 905 C2. Here, a drive motor which is configured as an electric motor acts via a drive shaft and a gear mechanism arrangement on an adjusting member which is configured as a drum, in order to actuate a window pane. In order then to provide a rotational direction locking means in a simple way, a wrap spring arrangement, consisting of a first wrap spring member and a second wrap spring member which act in opposite directions, is provided on the drive shaft. Wrap spring members of this type are well known and can bring about a type of freewheel of the associated shaft in the one direction here and locking of the associated shaft in the other direction.

It is a disadvantage of the above-described drive arrangement, however, that the gear mechanism arrangement, for example consisting of a plurality of gearwheels, causes a play. Said play is perceived as disruptive by the user and gives him/her the impression of a product which has not been produced with sufficient quality.

SUMMARY

An embodiment of the present invention provides a drive arrangement for a motor vehicle functional part that includes: a housing, in which a drive motor, a gear mechanism and an adjustor are provided at least partially; a drive shaft configured to transfer the adjustor via the gear mechanism from a closed position into an open position and vice versa; and a wrap spring arrangement comprising two wrap spring members, which act in opposite directions. The wrap spring arrangement is arranged on a gear mechanism output side, in a region of the adjustor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a drive arrangement which avoids the abovementioned disadvantage in a simple and inexpensive way.

An embodiment of the present invention provides a wrap spring arrangement that is arranged on the gear mechanism output side, in the region of the adjusting member.

In a particularly advantageous way, the adjusting member has an adjusting shaft, on which the wrap spring arrangement acts. Here, a sleeve can be provided on the adjusting shaft in one particularly advantageous embodiment, on the inner side of which sleeve the first wrap spring member is arranged which wraps around the adjusting shaft, engages with one end into an opening of the sleeve, and on the outer side of which sleeve the second wrap spring member is arranged which wraps around the sleeve and engages with one end into a stationary housing part of the housing arrangement (or housing). A very compact arrangement of the adjusting shaft with an integrated wrap spring arrangement is possible as a result. A drive arrangement can be configured in a particularly compact manner by virtue of the fact that the two ends of the first and the second wrap spring member run in a plane which preferably extends perpendicularly with respect to the rotational axis of the adjusting shaft.

Here, in an advantageous way, the functional part can be a rear spoiler, a rotation of the adjusting shaft toward the open position, that is to say toward the extended position of the rear spoiler, leading to an increase of the diameter of the first wrap spring member, as a result of which a rotation between the adjusting shaft and the first wrap spring member is made possible, with the result that the first wrap spring member is supported on the inner side of the sleeve when a target torque is reached.

In a particularly simple way, the opening in the sleeve can be configured as a slot.

The invention will be described in greater detail using the drawings.

Figure 1:
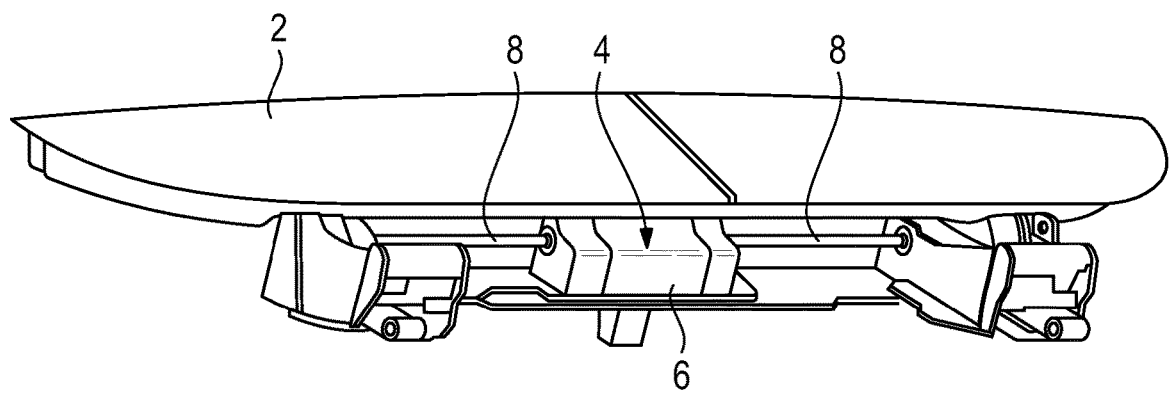
FIG. 1 shows a perspective view of a rear spoiler having a drive arrangement according to the invention.

FIG. 1 shows a perspective view of a functional part 2 which is configured as a rear spoiler, is arranged in a rear region of a motor vehicle (not shown in further detail), and can be operated in a closed position (shown) and in an extended open position. In the retracted closed position, the rear spoiler 2 which is shown is retracted with a shape which is adapted to surrounding vehicle body parts. Even merely a slight possible movement in this state by way of the driver on account of an existing play in a drive arrangement 4 is perceived as disruptive by the user. Of the drive arrangement 4, FIG. 1 shows a housing arrangement 6 having an adjusting member (or adjustor) 8 which protrudes out of it and is configured as an adjusting shaft.

Figure 2:
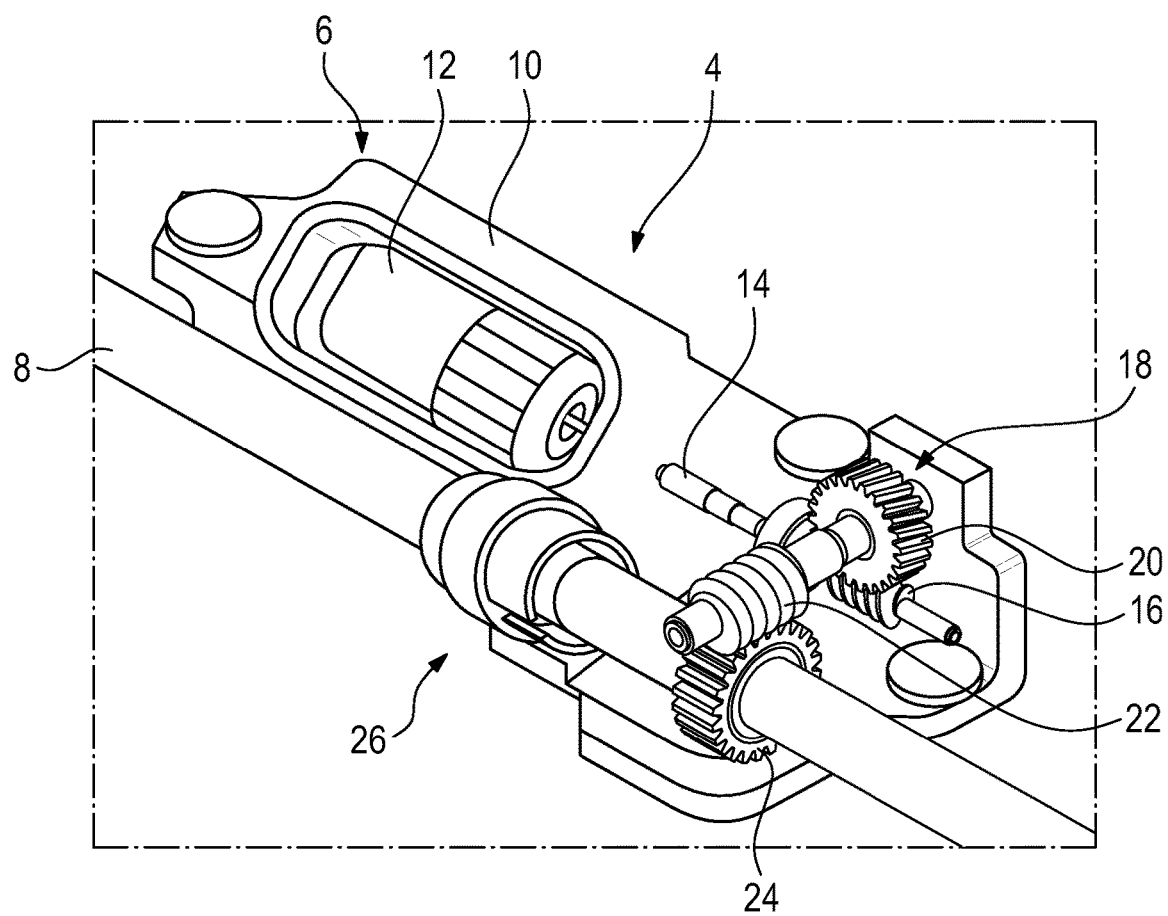
FIG. 2 shows a partially sectioned, perspective view of the drive arrangement from FIG. 1.

FIG. 2 shows a partially sectioned detailed view of the drive arrangement 4 from FIG. 1. A drive motor 12 which drives a drive shaft 14 in a known way is provided in a housing part 10 of the housing arrangement 6. A first worm 16 of a gear mechanism arrangement (or gear mechanism) 18 is provided on the drive shaft 14, which first worm 16 interacts in a known way with a first worm gear 20. The first worm gear 20 in turn drives a second worm 22 which in turn acts on a second worm gear 24 which is connected fixedly to the adjusting shaft 8. The adjusting shaft 8 is in turn connected in a known way to the rear spoiler 2, in order to transfer the rear spoiler 2 in a manner which is driven by the drive motor 12 from the closed position which is shown into an open position and vice versa. In order to avoid a play and therefore a negative feel of the rear spoiler, the designation 26 here denotes a diagrammatically shown wrap spring arrangement which will be described in greater detail in FIGS. 3 and 4.

Figure 3:
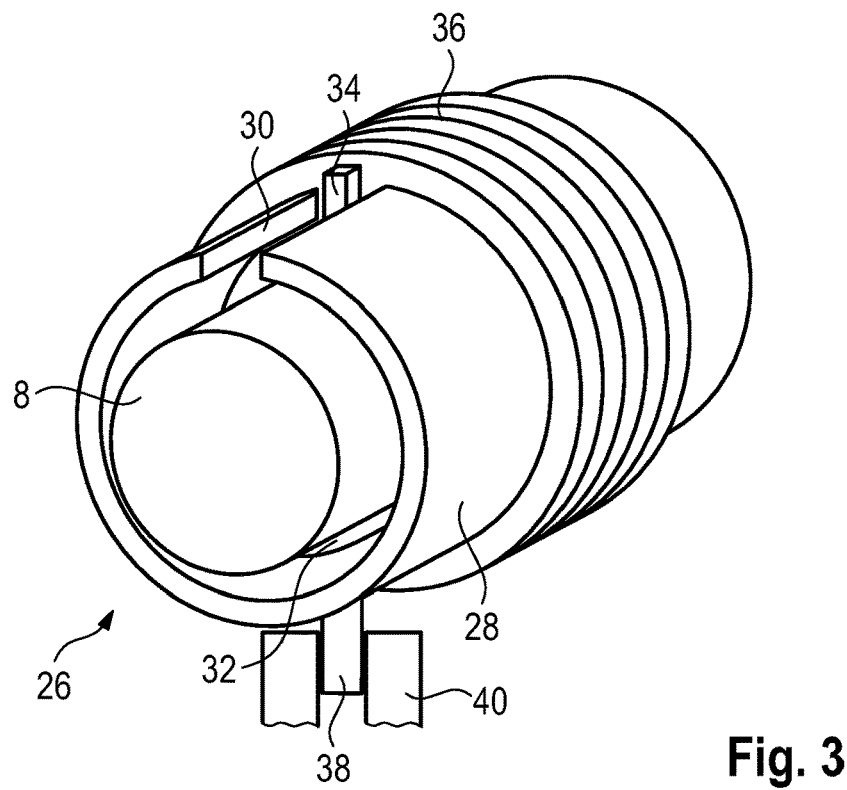
FIG. 3 shows a perspective view of the adjusting shaft of the drive arrangement in the region of a wrap spring arrangement.

FIG. 3 shows a perspective view of the wrap spring arrangement 26 which is operatively connected to the adjusting shaft 8. In order to make a particularly compact overall design of the wrap spring arrangement 26 and therefore of the drive arrangement 6 possible, a sleeve 28 is provided here which has an opening 30 which is configured as a slot and surrounds the adjusting shaft 8 radially. The first wrap spring member 32 which wraps around the adjusting shaft 8 is provided on the inner side of the sleeve 28. Here, the first wrap spring member 32 engages with one end 34 into the opening 30 of the sleeve 28. A second wrap spring member 36 is provided on the outer side of the sleeve 28, which second wrap spring member 36 engages with one end 38 into a stationary housing part 40 (shown diagrammatically in FIG. 4) of the housing arrangement 6. Here, the second wrap spring member 36 therefore wraps around the sleeve 28.

Figure 4:
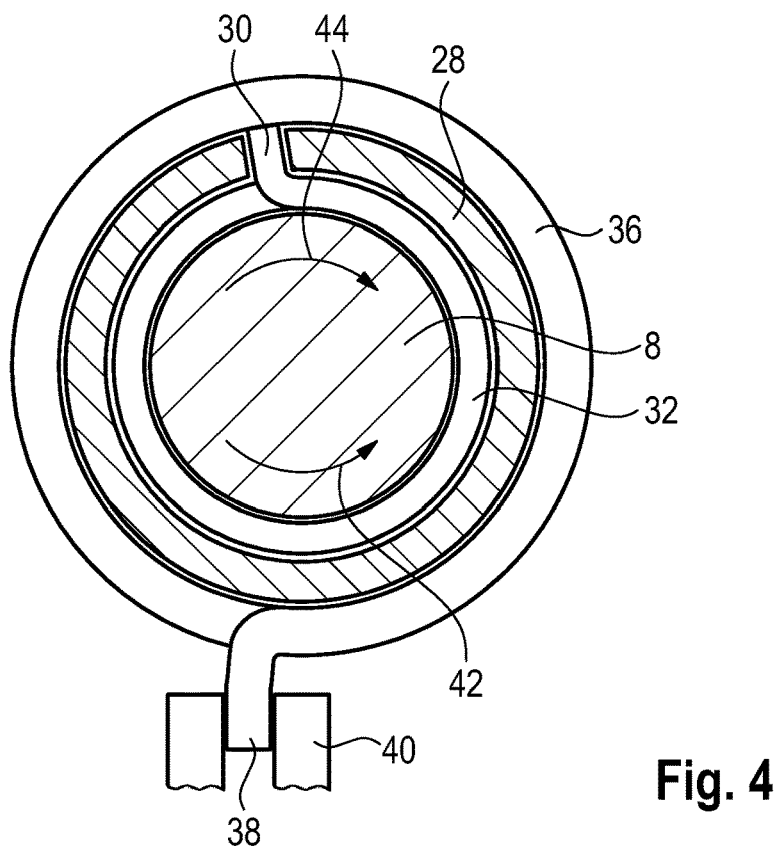
FIG. 4 shows a sectional view of the adjusting shaft in the region of the wrap spring arrangement.

The method of operation of the wrap spring arrangement 26 will be described in greater detail using FIG. 4. In FIG. 4, a rotational direction arrow 42 indicates the rotational direction of the adjusting shaft 8 which transfers the rear spoiler 2 from a closed position into an open position. Here, the first wrap spring member is "opened", which makes a rotation between the first wrap spring member and the adjusting shaft 8 possible. By way of contact of the first end 34, the sleeve 28 is moved and closes the second wrap spring member. The rotational direction arrow 44 denotes the opposite rotational direction, in the case of which the rear spoiler 2 is transferred from an open position into a closed position. Here, the sleeve 28 opens the second wrap spring member 36, which leads to a rotation between the second wrap spring member 36 and the sleeve 28. By way of contact of the first end 32 in the opening 30, the first wrap spring member is "closed", the torque which is produced being supported on the sleeve 28.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A drive arrangement for a motor vehicle functional part, the drive arrangement comprising:
a housing, in which a drive motor, a gear mechanism and an adjustor are provided at least partially;
a drive shaft configured to transfer the adjustor via the gear mechanism from a closed position into an open position and vice versa; the drive shaft coupling the drive motor to an input side of the gear mechanism, and
a wrap spring arrangement comprising two wrap spring members which act in opposite directions,
wherein the wrap spring arrangement is arranged on a gear mechanism output side, in a region of the adjustor.

2. The drive arrangement as claimed in claim 1, wherein the adjustor has an adjusting shaft.

3. A drive arrangement for a motor vehicle functional part, the drive arrangement comprising:
a housing, in which a drive motor, a gear mechanism and an adjustor are provided at least partially;
a drive shaft configured to transfer the adjustor via the gear mechanism from a closed position into an open position and vice versa; and
a wrap spring arrangement comprising two wrap spring members which act in opposite directions,
wherein the wrap spring arrangement is arranged on a gear mechanism output side, in a region of the adjustor,
wherein the adjustor has an adjusting shaft, and
wherein a sleeve is arranged on the adjusting shaft, wherein on the inner side of the sleeve, a first wrap spring member of the two wrap spring members is arranged, the first wrap spring member wrapping around the adjusting shaft, engaging with one end into an opening of the sleeve, and on an outer side of the sleeve a second wrap spring member of the two wrap spring members is arranged, the second wrap spring member wrapping around the sleeve and engaging with one end into a stationary housing part of the housing.

4. The drive arrangement as claimed in claim 3, wherein the two ends of the first spring wrap member and the second wrap spring member run in a plane.

5. The drive arrangement as claimed in claim 3, wherein the functional part is a rear spoiler, a rotation of the adjusting shaft toward the open position leads to an increase of a diameter of the first wrap spring member.

6. The drive arrangement as claimed in claim 3, wherein the opening in the sleeve is configured as a slot.

7. The drive arrangement as claimed in claim 4, wherein the plane extends perpendicularly with respect to a rotational axis of the adjusting shaft.

8. The drive arrangement as claimed in claim 5, wherein the open position is toward an extended position of the rear spoiler.

9. The drive arrangement as claimed in claim 2, wherein the wrap spring arrangement is arranged on the adjusting shaft.

10. The drive arrangement as claimed in claim 2, wherein the wrap spring members wraps around the adjusting shaft.

* * * * *